(No Model.)
E. J. BROOKS.
METALLIC SEAL.
No. 368,126. Patented Aug. 9, 1887.
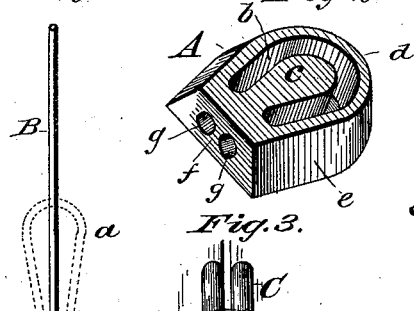
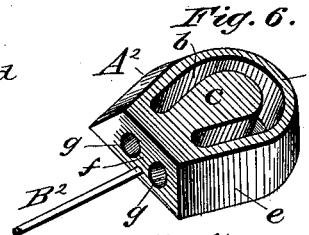
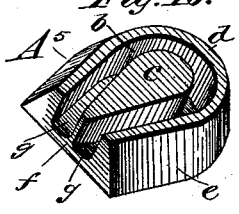
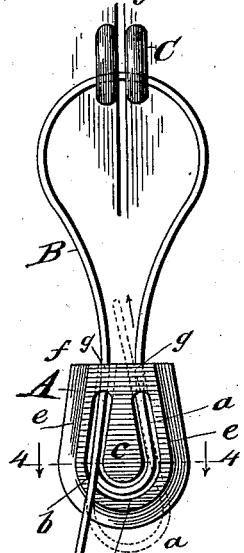
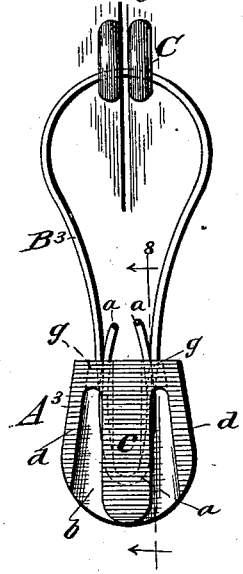
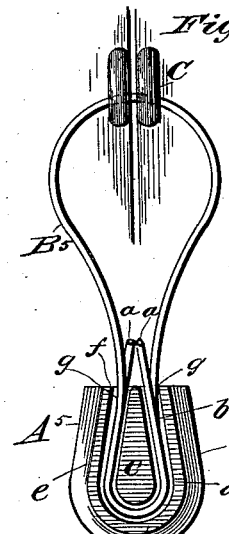
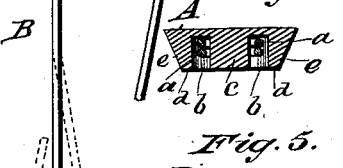
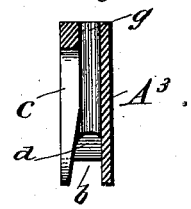
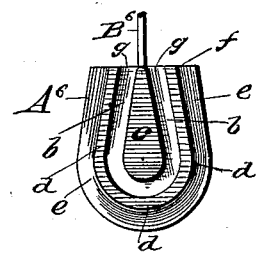
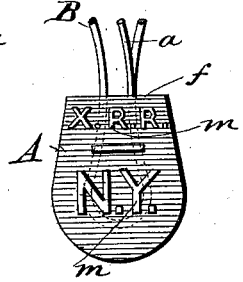
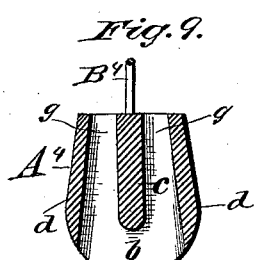
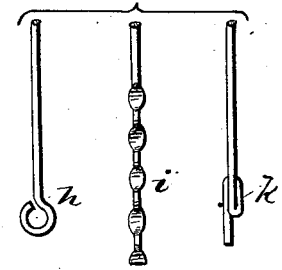
Witnesses:
Phil C. Dietrich
Joseph Becker
Inventor:
Edward J. Brooks.
by
T. L. Ewin
Attorney.

UNITED STATES PATENT OFFICE.

EDWARD J. BROOKS, OF EAST ORANGE, NEW JERSEY, ASSIGNOR TO E. J. BROOKS & COMPANY, OF NEW YORK, N. Y.

METALLIC SEAL.

SPECIFICATION forming part of Letters Patent No. 368,126, dated August 9, 1887.

Application filed June 29, 1887. Serial No. 242,882. (No model.)

*To all whom it may concern:*

Be it known that I, EDWARD J. BROOKS, a citizen of the United States, residing at East Orange, in the State of New Jersey, have invented a new and useful Improvement in Metallic Seals, of which the following is a specification.

This invention relates to those seals in which a soft-metal seal-disk, commonly of lead, is combined with a shackle of flexible wire, and it is primarily additional to my improvement in metallic seals patented March 4, 1884, (United States Patent No. 294,576,) which comprises lead-and-wire seals in which the free ends of the "wires," (as they are hereinafter commonly termed,) in the form of loops, are received by recesses in the faces of the seal-disks, so as to protect the loop against being tampered with by inclosing it within walls which are solid or practically solid at the edges of the seal-disk. The recesses, and in some cases the loops, are approximately of horseshoe shape, which has led to the designation of these seals in trade as "horseshoe" seals. Heretofore the seal-disks of these horseshoe-seals have in all cases been cast on one end of the wire, according to my said patent of March 4, 1884, one end only of the wire being fastened in the manner aforesaid.

The primary object of the present invention is to adapt such seal-disks to so receive and to securely so fasten both ends of the wire, whereby the seal-disks may be more cheaply cast and may be used in connection with ordinary commercial wire, or wire of any preferred style, furnished in straight lengths and bent as required by the sealers.

Another object of this invention is to facilitate forming as well as introducing the loop at the sealing operation, whether the wires have one or two free ends, and by the same means to render the seal, especially if of large size, more secure at the open edge of the seal-disk.

The invention consists in certain novel combinations of parts, depending, respectively, upon the peculiar construction of the seal-disk, as hereinafter set forth and claimed.

A sheet of drawings accompanies this specification as part thereof.

Figure 1 of the drawings represents a shackle of ordinary commercial wire before and after the looping of its ends. Fig. 2 is a perspective view of a seal-disk to accompany said wire. Fig. 3 is a face view of said seal-disk, illustrating the combination of the wire therewith at the sealing operation. Fig. 4 represents a cross-section on the line 4 4, Fig. 3, showing the seal ready for the press. Fig. 5 is a face view of the seal-disk pressed. Fig. 6 is a perspective view of a suitable seal-disk cast on one end of the wire. Fig. 7 is a face view of another seal-disk combined with a loose wire and ready for the press. Fig. 8 represents a longitudinal section of the seal-disk on the line 8 8, Fig. 7. Fig. 9 represents a sectional face view of a similar seal-disk cast on one end of the wire. Fig. 10 is a perspective view of a seal-disk, illustrating another modification. Fig. 11 is a face view of the same combined with a loose wire and ready for the press. Fig. 12 is a face view of a similar seal-disk cast on one end of the wire. Fig. 13 represents three illustrative formations of the cast-in end of the wires represented in Figs. 6, 9, and 12. Fig. 14 represents a small horseshoe seal-disk and a ready-bent wire for use therewith, and Fig. 15 represents a longitudinal section of the same as combined and ready for the press.

Like letters of reference indicate corresponding parts in all the figures.

Each of the several metallic seals represented by the drawings is composed of a horseshoe seal-disk, A, $A^2$, $A^3$, $A^4$, $A^5$, $A^6$, or $A^7$, and a shackle or wire, B, $B^2$, $B^3$, $B^4$, $B^5$, $B^6$, or $B^7$, the free end or each free end of the wire being bent into a loop, *a*, of horseshoe shape, at or before the sealing operation, and received in this shape by a recess, *b*, of the same or approximately the same shape, in the face of the seal-disk, within which the loop embraces a central post, *c*, which must be cut through if the loop be withdrawn, while solid edge walls *d* keep the loop from opening under lengthwise strain, and the recess locates its main bend so far within the disk as to prevent access thereto.

In the seal represented by Figs. 1 to 5, inclusive, which embodies all the several parts of the present invention, the seal-disk A contains a recess *b* of sufficient depth to receive loops *a* on both ends of the wire B, one over or upon the other, and to insure turning in the deep edge wall *d* at every point the edges *c* of the disk, excepting its "top" f, are beveled from back to front, as best seen in Fig. 4. These features of this seal are common to it and those seals with loose wires represented by Figs. 10, 11, 14, and 15, as indicated by corresponding reference-letters. Referring again to Figs. 1 to 5, it will be seen that the top f of said seal-disk A is provided with a pair of apertures, g, which communicate with the respective upper ends of the recess b, so that each free end of the wire B may be threaded obliquely through one aperture, as illustrated at the left-hand side of the seal in Fig. 3, and then back through the other aperture, as represented by dotted lines, so as to complete the loop thereof by pulling the wire endwise. Upon reaching the required size the loop a is instantly pressed into the recess b by the thumb of the hand which grasps the seal-disk. This feature is common to all the seals represented by the drawings, save only that one represented by Figs. 14 and 15. Referring again to said Figs. 1 to 5, it will be seen that said apertures g, in the form of holes, penetrate an otherwise solid upper end of the disk which unites the ends of its side walls, d, so as to preclude bending them apart. This construction materially increases the security of the seal, especially when made of large size. It also further facilitates forming the loops as aforesaid. It is common to this seal and those represented by Figs. 6, 7, 8, and 9. Referring once more to said Figs. 1 to 5, it will be observed that said edge walls d and beveled edges e extend continuously around the bottom as well as at the lateral edges of the seal-disk, so as to preclude edgewise access to the loop within the seal-disk at all points. This construction is preferred and is common to all the seals represented by the drawings, except those represented by Figs. 7, 8, and 9.

The modified seal represented by Fig. 6 is identical with said seal represented by Figs. 1 to 5, except that its seal-disk $A^2$ is cast fast on one end of the wire $B^2$, so that its recess b, post c, edge walls d, beveled edge e, top f, and apertures g aid in securing the other end only.

The modified seal-disks $A^3$ and $A^4$ of the seals represented by Figs. 7, 8, and 9 are designed to be cast in simpler molds, with that part which forms the recess b removable endwise. They consequently have open lower ends, to compensate for which the post c is undercut, as indicated by dotted lines in Fig. 7 and clearly shown in Figs. 8 and 9. The loop a is drawn up around the contracted shank of the post, and when the seal is pressed the post itself more securely envelops the main bend of the loop, so as to prevent access to it.

The modified seal-disks $A^5$ and $A^6$ of the seals represented by Figs. 10, 11, and 12 are identical with said seal-disks A and $A^2$, save only that their apertures g are open in front, so that they, as well as the recess b, may be formed by a mold part withdrawn perpendicularly to the face of the disk. Consequently these apertures would have to be guarded at the face of the seal by the thumb of the hand which grasps the seal-disk in forming the loops by rethreading and pulling the wire in the manner aforesaid.

The wires $B^3$ and $B^5$ may be identical with said wire B. Like said wire $B^2$, the wires $B^4$ and $B^6$ are each "cast in" at one end, as aforesaid. The cast-in ends of these wires may be anchored in any approved way. For example, as illustrated by Fig. 13, either of them may be anchored within the seal-disk by means of a loop, h, as set forth in my patent, No. 154,639, dated September 1, 1874, or by indentations i, as set forth in my patent, No. 179,260, dated June 27, 1876, or by one or more enlargements, k, as set forth in my patent, No. 192,735, dated July 3, 1877. These examples may suffice.

The small seal represented by Figs. 14 and 15 has a single aperture, $g'$, in the top f of its seal-disk $A^7$, which is thus and otherwise adapted to coact with ready-formed loops a at both extremities of its wire $B^7$.

Other like modifications will suggest themselves to those skilled in the art. I propose, for example, to use in connection with either of the aforesaid seal-disks any of my patented wires which may be suitable; and the seal-disks may be round or of other shapes externally, if preferred.

To facilitate carrying and applying those seals which have loose wires, one end of the wire may be preliminarily united with the seal-disk in the manner aforesaid, as illustrated at the right-hand side in Fig. 3. The seals are applied to car-door staples C, or the like, in customary manner, and after forming and introducing the last of their loops, as aforesaid, are fastened by means of a suitable seal-press, which solidifies the seal-disk around the loops. The previously open face of the seal-disk is thus closed up in front of the loops, as represented in Fig. 5, and is guarded against being tampered with by the press-marks m, which are formed upon or in the same, and may be of any approved character.

Having thus described my said improvement in metallic seals, I claim as my invention and desire to patent under this specification—

1. The combination, in a metallic seal, of a loose shackle-wire having a loop at each end, a seal-disk having a recess in its face which receives said loops one over or upon the other, a central post within the loops, edge walls around the same, and a beveled edge, substantially as herein specified.

2. The combination, with a suitable shackle-wire, of a seal-disk having a recess in its face, a central post, edge walls, a solid upper end uniting said walls at this point, and a pair of apertures in the top of the seal-disk communicating with said recess on the respective sides of said post, substantially as herein specified, for the purpose set forth.

EDWARD J. BROOKS.

Witnesses:
H. L. C. WENK,
JAMES E. HOLLEY.